United States Patent
Lin et al.

(10) Patent No.: US 12,337,298 B1
(45) Date of Patent: Jun. 24, 2025

(54) WATER TREATMENT MATERIAL, PREPARATION, AND USE FOR ELECTRICALLY ENHANCED ADSORPTIVE FILTRATION

(71) Applicant: TSINGHUA SHENZHEN INTERNATIONAL GRADUATE SCHOOL, Guangdong (CN)

(72) Inventors: Lin Lin, Guangdong (CN); Wutong Chen, Guangdong (CN); Junkuo Liu, Guangdong (CN); Xiaoyan Li, Guangdong (CN); Ruiquan Yu, Guangdong (CN); Zeyao Yin, Guangdong (CN)

(73) Assignee: TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 19/019,656

(22) Filed: Jan. 14, 2025

(30) Foreign Application Priority Data

Apr. 3, 2024 (CN) .................. 202410402188.6

(51) Int. Cl.
*B01J 20/32* (2006.01)
*B01J 20/20* (2006.01)
(Continued)

(52) U.S. Cl.
CPC .......... *B01J 20/3217* (2013.01); *B01J 20/20* (2013.01); *B01J 20/262* (2013.01); *B01J 20/28045* (2013.01); *B01J 20/3078* (2013.01); *B01J 20/3085* (2013.01); *B01J 20/3204* (2013.01); *B01J 20/3272* (2013.01); *B01J 20/3425* (2013.01); *C02F 1/288* (2013.01); *C02F 1/48* (2013.01); *C02F 1/283* (2013.01); *C02F 1/285* (2013.01); *C02F 2101/105* (2013.01);
(Continued)

(58) Field of Classification Search
None
See application file for complete search history.

(56) References Cited

U.S. PATENT DOCUMENTS

| | | | |
|---|---|---|---|
| 6,881,348 B2 * | 4/2005 | Cannon .................... | B01J 20/20 210/683 |
| 7,712,613 B2 * | 5/2010 | Bahm ................ | B01J 20/28023 210/507 |

FOREIGN PATENT DOCUMENTS

| | | |
|---|---|---|
| CN | 108074751 A * | 5/2018 |
| CN | 110918072 A | 3/2020 |

(Continued)

OTHER PUBLICATIONS

Machine translation of CN108074751A (Year: 2025).*
(Continued)

*Primary Examiner* — Chester T Barry
(74) *Attorney, Agent, or Firm* — Renner, Otto, Boisselle & Sklar, LLP (57) ABSTRACT

The present disclosure relates to a water treatment material for electrically enhanced adsorptive filtration, and a preparation method and use thereof. In the present disclosure, a melamine sponge is carbonized under protection of an inert gas, so that the sponge has a satisfactory electrical conductivity. Then, a N-rich melamine sponge is further prepared by amino modification and is utilized as a precursor, which has a larger specific surface area. The dopamine and the polyethyleneimine are modified to improve the adsorption potential of the sponge.

18 Claims, 5 Drawing Sheets

(51) Int. Cl.
  *B01J 20/26* (2006.01)
  *B01J 20/28* (2006.01)
  *B01J 20/30* (2006.01)
  *B01J 20/34* (2006.01)
  *C02F 1/28* (2023.01)
  *C02F 1/48* (2023.01)
  C02F 101/10 (2006.01)
  C02F 101/16 (2006.01)
  C02F 101/30 (2006.01)
  C02F 101/38 (2006.01)

(52) U.S. Cl.
  CPC .... *C02F 2101/16* (2013.01); *C02F 2101/308* (2013.01); *C02F 2101/38* (2013.01); *C02F 2303/16* (2013.01)

(56) References Cited

FOREIGN PATENT DOCUMENTS

| | | | |
|---|---|---|---|
| CN | 113385046 A | * | 9/2021 |
| CN | 117800439 A | * | 4/2024 |
| WO | 2024060516 A1 | | 3/2024 |

OTHER PUBLICATIONS

Machine translation of CN113385046A (Year: 2025).*
Machine translation of CN117800439A (Year: 2025).*
International Search Report and Written Opinion for International Application No. PCT/CN2024/088879 and English translation, mailed Dec. 28, 2024. pp. 1-3.

* cited by examiner

WATER TREATMENT MATERIAL, PREPARATION, AND USE FOR ELECTRICALLY ENHANCED ADSORPTIVE FILTRATION

CROSS-REFERENCE TO RELATED APPLICATIONS

This application claims the benefit of, and priority to Chinese Patent Application No. 2024104021886, filed Apr. 3, 2024, the contents of which are herein incorporated by reference in their entirety and for all purposes.

TECHNICAL FIELD

The present disclosure relates to the technical field of polymer materials, and in particular to a water treatment material for electrically enhanced adsorptive filtration, and a preparation method and use thereof.

BACKGROUND

With the continuous growth of global population, the problem of water resources has become more and more prominent. It is reported by the United Nations that about a quarter of the population around the world lives in areas where water resources are scarce, and this number is expected to continue to grow in the coming decades. Meanwhile, factors such as over-exploitation of water resources, pollution, climate changes also pose a threat to the supply of global water resources. In many regions, water resources face increasingly urgent challenges due to rapid development of urbanization and industrialization. These challenges not only affect people's daily lives, but also have profound impacts on the environment, agriculture and industry.

To address problems of water resource scarcity and water pollution, researchers and engineers have been always working tirelessly to find efficient and sustainable methods for water treatment. Although traditional methods for water treatment, e.g. chemical treatment and biological treatment, can purify the water body to a certain extent, there are still some problems that cannot be ignored. For example, chemical methods typically consume a huge amount of energy sources and chemical agents, while biological methods are limited by environmental conditions such as climate and water quality. Therefore, there is an urgent need for a novel technique for water treatment that can effectively remove pollutants from water.

Among various techniques for water treatment, adsorption technique has attracted much attention due to its high efficiency and universality. Adsorption is a method for removing pollutant particles from water by aggregating them on the surface or internal structure of an adsorbent. Compared with other treatment methods, the adsorption technique has many advantages, e.g. easy and convenient to operate, unrestricted by environmental factors, and widely applicable to a variety of pollutants, etc. Due to its flexibility and high efficiency, the adsorption technique has been widely applied in fields such as water treatment, wastewater treatment and drinking water purification. However, with respect to traditional adsorption materials such as activated carbon and lignin, problems such as low adsorption efficiency and difficulty in regeneration, still exist. Therefore, it is necessary to provide a water treatment material for electrically enhanced adsorptive filtration, and a preparation method and use thereof, so as to produce efficient and recyclable adsorption materials, thereby further improving the removal efficiency of pollutants.

SUMMARY

The present disclosure aims to solve at least one of the above technical problems existed in the prior art. To this end, the present disclosure proposes a water treatment material for electrically enhanced adsorptive filtration, and a preparation method and use thereof, so as to produce a highly efficient and recyclable adsorption material, thereby further improving the removal efficiency of pollutants and improving the efficiency of regeneration and utilization of the adsorbent.

In a first aspect of the present disclosure, a preparation method for a water treatment material for electrically enhanced adsorptive filtration is provided.

Specifically, the method comprises the following steps:
(1) ultrasonically cleaning a melamine sponge, oven-drying, placing in a tubular furnace, introducing a protective gas to the tubular furnace, setting a heating rate to 4-6° C.·min$^{-1}$, preheating, and then continually heating to a temperature of 900-1,100° C., keeping the temperature, and cooling to room temperature to obtain an ultralight and flexible carbon sponge; and
(2) dissolving tris(hydroxymethyl)aminomethane in a solvent to obtain a tris(hydroxymethyl)aminomethane solution, adjusting a pH to 8.4-8.6, then adding dopamine and polyethyleneimine to the solution, mixing to obtain a mixture, adding the ultralight and flexible carbon sponge to the mixture, and reacting under stirring for 10-14 h to prepare the water treatment material for electrically enhanced adsorptive filtration.

Preferably, in the step (1), the placing in the tubular furnace further comprises placing a melamine sponge after the oven-drying in a corundum burning boat, and then placing the corundum burning boat in the tubular furnace.

Further preferably, the tubular furnace is a quartz tubular furnace.

Preferably, in the step (1), the ultrasonic cleaning is conducted for 8-12 min.

Further preferably, the ultrasonic cleaning is conducted for 10 min.

Preferably, in the step (1), a rate of introducing the protective gas is 80-120 mL/min.

Further preferably, in the step (1), the rate of introducing the protective gas is 100 mL/min.

Preferably, in the step (1), the melamine sponge is a cylinder with a bottom diameter of 0.5-1.5 cm and a height of 4-6 cm.

Further preferably, the melamine sponge is the cylinder with the bottom diameter of 1 cm and the height of 5 cm.

Preferably, in the step (1), the oven-drying is conducted at a temperature of 100-110° C. for a time of 8-16 h.

Further preferably, in the step (1), the oven-drying is conducted at the temperature of 105° C. for the time of 8-16 h.

Preferably, in the step (1), the protective gas comprises at least one of Ar, $N_2$, or $H_2$.

Preferably, in the step (1), the preheating is conducted at a temperature of 200-300° C. for a time of 20-40 min.

Further preferably, the preheating is conducted at the temperature of 250° C. for the time of 30 min.

Preferably, in the step (1), the keeping the temperature lasts for a time of 100-150 min.

Further preferably, the keeping the temperature lasts for the time of 120 min.

Preferably, in the step (1), the continually heating reaches the temperature of 1,000° C.

Preferably, in the step (1), the heating rate is set to 5° C.·min$^{-1}$.

Preferably, in the step (2), a mass concentration of the tris(hydroxymethyl)aminomethane solution is 0.1-1%.

Further preferably, the mass concentration of the tris (hydroxymethyl)aminomethane solution is 0.6%.

Preferably, in the step (2), a mass ratio of the dopamine to the polyethyleneimine is 1:(1-4).

Further preferably, the mass ratio of the dopamine to the polyethyleneimine is 1:2.

Preferably, in the step (2), the solvent is ultrapure water.

Preferably, in the step (2), the pH is adjusted to 8.5.

In a second aspect of the present disclosure, a water treatment material for electrically enhanced adsorptive filtration is provided.

Specifically, the water treatment material for electrically enhanced adsorptive filtration is prepared by the preparation method of the first aspect.

In a third aspect of the present disclosure, use of a water treatment material for electrically enhanced adsorptive filtration in adsorptive removal of a broad-spectrum pollutant in a water body is provided.

Preferably, the water treatment material for electrically enhanced adsorptive filtration has at least one of the following functions (1)-(2):
(1) an adsorption capacity of the water treatment material for electrically enhanced adsorptive filtration is enhanced under an action of an electric field, thereby improving an adsorption efficiency of an organic matter and a nutrient element in water; and
(2) the water treatment material for electrically enhanced adsorptive filtration has an adjustable pore size, filtration is conducted during compression to realize pollutant adsorption of a sponge in a compressed state, and backwashing is conducted during decompression to realize efficient adsorption and regeneration of the material.

Preferably, the broad-spectrum pollutant in the water body comprises total suspended solids, total organic carbon, ammonia nitrogen, phosphates, and organic matters.

Compared with the prior art, beneficial effects of the present disclosure are as follows.
(1) a N-rich melamine sponge is utilized in the present disclosure as a precursor, which has a larger specific surface area;
(2) after high-temperature carbonization in an inert gas, the sponge has a satisfactory electrical conductivity;
(3) the dopamine and the polyethyleneimine are modified to prepare a water treatment material for electrically enhanced adsorptive filtration, thereby further improving the capacitance performance and hydrophilicity of the carbon sponge and increasing the adsorption potential of the carbon sponge;
(4) by utilizing the action of the electric field, the adsorption efficiency of the organic matters and the nutrient elements in water can be significantly improved; and
(5) by utilizing the compressibility of the water treatment material for electrically enhanced adsorptive filtration, it is realized that the sponge absorbs pollutants in a compressed state, and the sponge is backwashed in a decompressed state, thereby achieving efficient adsorption and regeneration of the material.

DETAILED DESCRIPTION

In order to enable those ordinary skilled in the art to clearly understand the technical scheme of the present disclosure, the following examples are exemplified for illustration. It should be pointed out that, the following examples do not pose limitation on the protection scope of the present disclosure.

Unless otherwise specified, the raw materials, reagents or devices used in the following examples can be obtained through conventional commercial approaches or by existing known methods.

Example 1

A water treatment material for electrically enhanced adsorptive filtration and a preparation method thereof, were provided.

Specifically, the method comprised the following steps:
(1) a commercial melamine sponge was cut into a cylinder with a bottom diameter of 1 cm and a height of 5 cm, and ultrasonically cleaned with ultrapure water in an ultrasonic cleaner for 10 min. The sponge was placed in an oven at 105° C., and oven-dried for 16 h to remove the water adsorbed by the sponge during the cleaning process. The cleaned sponge was placed in a corundum burning boat to make heat transfer more uniform. The burning boat was placed in a quartz tubular furnace, and Ar/H$_2$ was introduced as protective gas at a ventilation rate set to 100 mL/min. A heating rate of the tubular furnace was set to 5° C.·min$^{-1}$, and preheating was conducted at 250° C. for 30 min to remove part of bound water in the sponge. The tubular furnace was continually heated to a temperature of 1,000° C., kept at this temperature for 120 min, and then naturally and slowly cooled to room temperature to prepare an ultralight and flexible carbon sponge.

(2) 0.6 g of tris(hydroxymethyl)aminomethane (Tris) was dissolved in 100 mL of ultrapure water. At this time, a tris(hydroxymethyl)aminomethane solution had a pH value of about 10.5, the pH was adjusted to 8.5 with dilute hydrochloric acid. Then 0.2 g of dopamine (DA) and 0.4 g of polyethyleneimine (PEI) were added to the Tris solution and mixed to obtain a mixture. The ultralight and flexible carbon sponge was placed into the mixture and reacted under stirring on a shaker for 12 h to prepare the water treatment material for electrically enhanced adsorptive filtration.

Comparative Example 1

An ultralight and flexible carbon sponge and a preparation method thereof were provided.

The difference from Example 1 was that the method of Comparative Example 1 did not contain a step of amino modification, and the method of Comparative Example 1 comprised the following steps:

(1) a commercial melamine sponge was cut into a cylinder with a bottom diameter of 1 cm and a height of 5 cm, and ultrasonically cleaned with ultrapure water in an ultrasonic cleaner for 10 min. The sponge was placed in an oven at 105° C., and oven-dried for 16 h to remove the water adsorbed by the sponge during the cleaning process. The cleaned sponge was placed in a corundum burning boat to make heat transfer more uniform. The burning boat was placed in a quartz tubular furnace, and $Ar/H_2$ was introduced as protective gas at a ventilation rate set to 100 mL/min. A heating rate of the tubular furnace was set to 5° C.·min$^{-1}$, and preheating was conducted at 250° C. for 30 min to remove part of bound water in the sponge. The tubular furnace was continually heated to a temperature of 1,000° C., kept at this temperature for 120 min, and then naturally and slowly cooled to room temperature to prepare an ultralight and flexible carbon sponge.

Comparative Example 2

An amino-modified sponge and a preparation method thereof were provided.

The difference from Example 1 was that the method of Comparative Example 2 did not contain a step of carbonizing the melamine sponge, and the method of Comparative Example 2 comprised the following steps:

(1) 0.6 g of Tris was dissolved in 100 mL of ultrapure water. At this time, a Tris solution had a pH value of about 10.5, the pH was adjusted to 8.5 with dilute hydrochloric acid. Then 0.2 g of DA and 0.4 g of PEI were added to the Tris solution and mixed to obtain a mixture. A commercial melamine sponge was placed into the mixture and reacted under stirring on a shaker for 12 h to prepare the amino-modified sponge.

Figure 1:
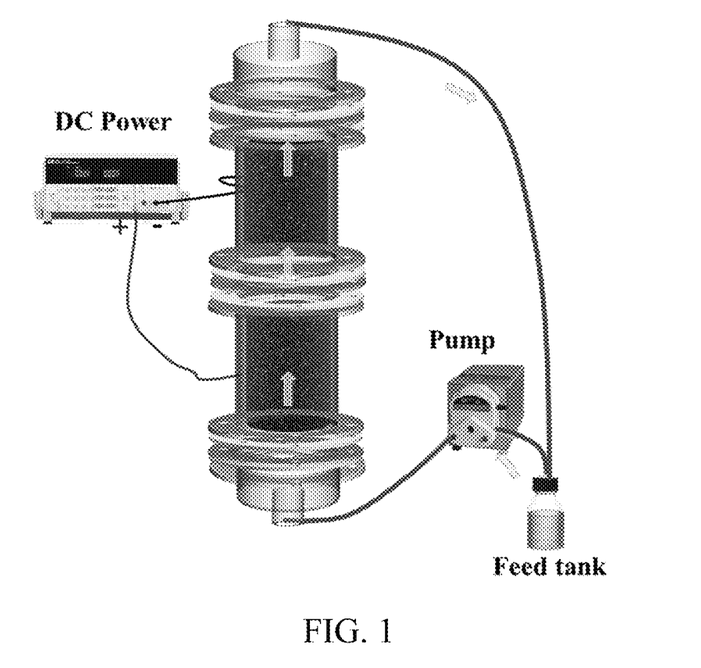
FIG. 1 is a schematic structural diagram of the reaction system.
Figure 2:
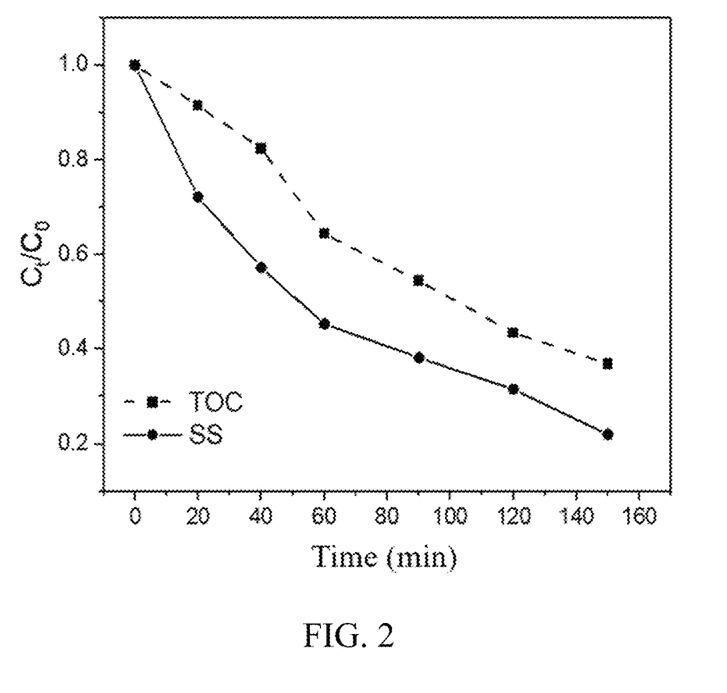
FIG. 2 is a diagram showing the removal effect of the water treatment material for electrically enhanced adsorptive filtration of Example 1 on Total Organic Carbon (TOC) and Suspended Solids (SS)

Evaluation on adsorptive removal performance:
1. Adsorptive Removal of SS and TOC in Water without Electric Field Enhancement The reaction system as shown in FIG. 1 was used to assist the test. The reaction system was composed of a reactor, a peristaltic pump, a water storage tank, and a direct current (DC) power supply. Domestic sewage was taken as a water sample to be purified, and 3 pieces of the water treatment material for electrically enhanced adsorptive filtration prepared in Example 1 were placed at the anode and the cathode respectively. As shown in FIG. 2, after filtration for 150 min, 63% of TOC and 78% of SS could be removed.

Figure 3:
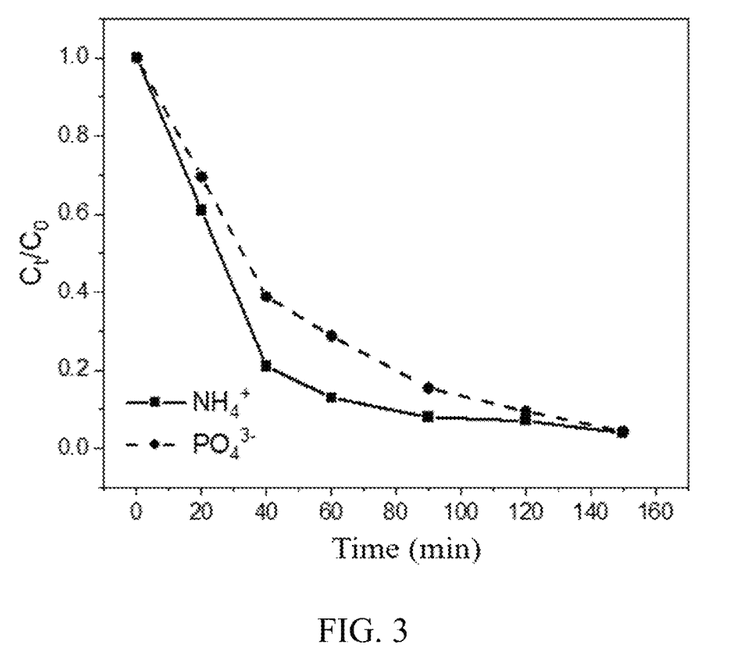
FIG. 3 is a diagram showing the removal effect of the water treatment material for electrically enhanced adsorptive filtration of Example 1 on ammonia nitrogen and phosphates.

2. Adsorptive Removal of Nitrogen and Phosphorus in Water Under Electric Field Enhancement The reaction system as shown in FIG. 1 was used to assist the test. Simulated wastewater was formulated with ammonium chloride and sodium dihydrogen phosphate for the experiment, with an ammonia nitrogen concentration of 20 mg/L and a phosphate concentration of 2 mg/L. 3 pieces of the water treatment material for electrically enhanced adsorptive filtration prepared in Example 1 were placed at the anode and the cathode, respectively. As shown in FIG. 3, 95% of the ammonia nitrogen and the phosphate could be removed under an electric field of 2 V within a treatment time of 150 min.

3. Cycling Stability Test

Figure 4:
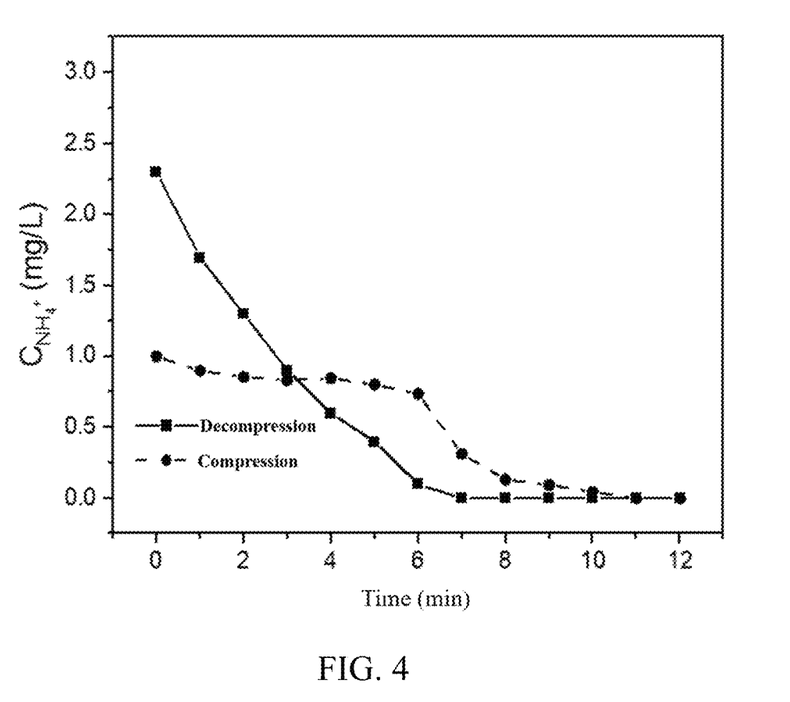
FIG. 4 is a diagram showing the efficiency of desorption of $NH_4^+$ by backwashing of the water treatment material for electrically enhanced adsorptive filtration of Example 1 under decompressed/compressed states.
Figure 5:
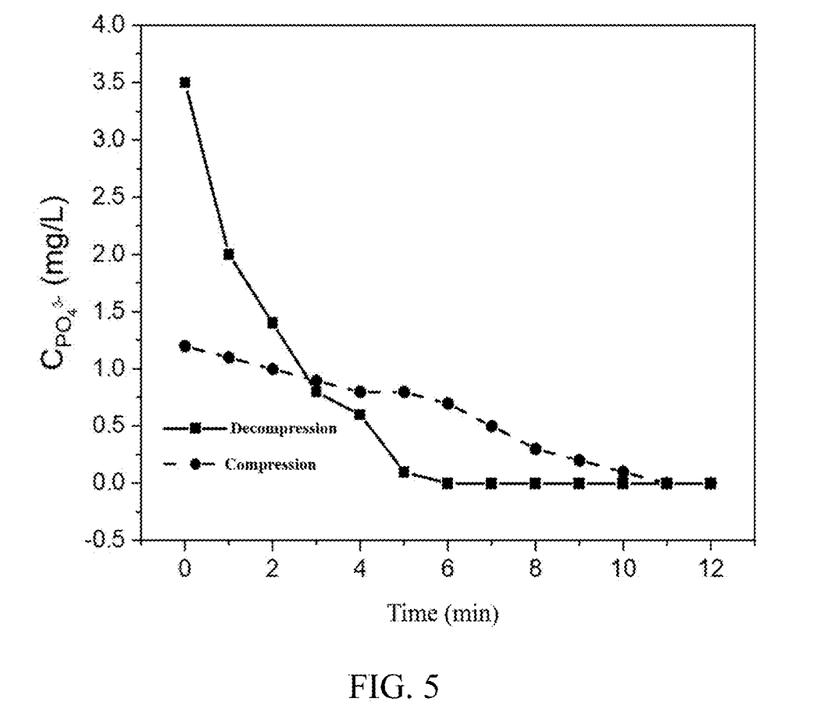
FIG. 5 is a diagram showing the efficiency of desorption of $PO_4^{3-}$ by backwashing of the water treatment material for electrically enhanced adsorptive filtration of Example 1 under decompressed/compressed states.
Figure 6:
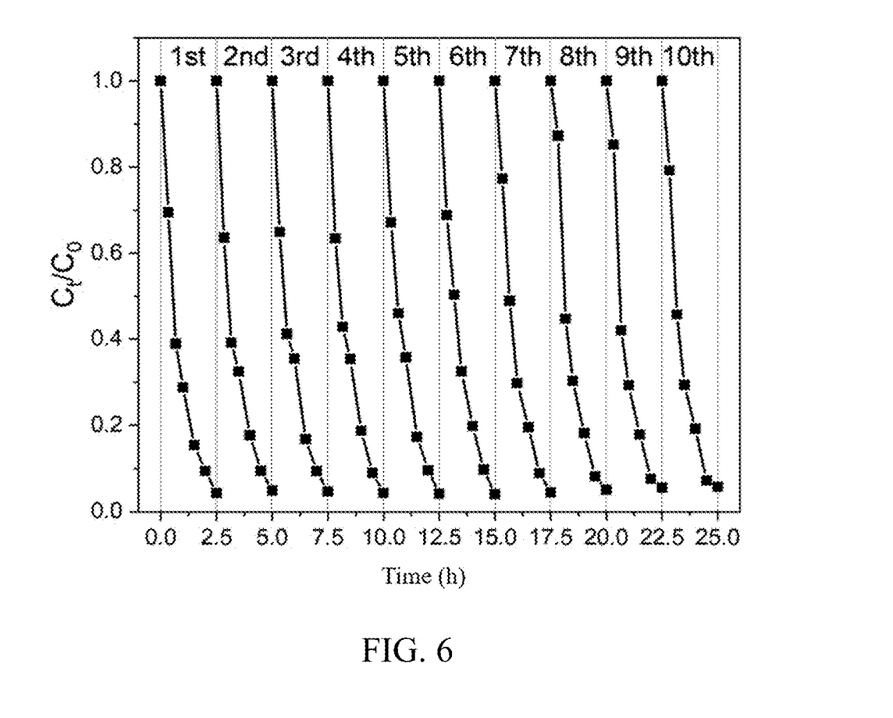
FIG. 6 is a diagram showing the cycling stability of phosphorus removal performance of the water treatment material for electrically enhanced adsorptive filtration of Example 1.

After adsorption was saturated, by means of decompression and backwashing, faster desorption of nitrogen and phosphorus ions than that of backwashing in a compressed state ($NH_4^+$: 7 vs. 11 min; and $PO_4^{3-}$: 6 vs. 11 min) could be achieved (as shown in FIG. 4 and FIG. 5). By using a method of decompression and backwashing for desorption, the water treatment material for electrically enhanced adsorptive filtration prepared in Example 1 could achieve a removal efficiency that was maintained for about 95% after 10 cycles of experiments (as shown in FIG. 6).

4. Adsorptive Removal of Organic Pollutants in Water

Figure 7:
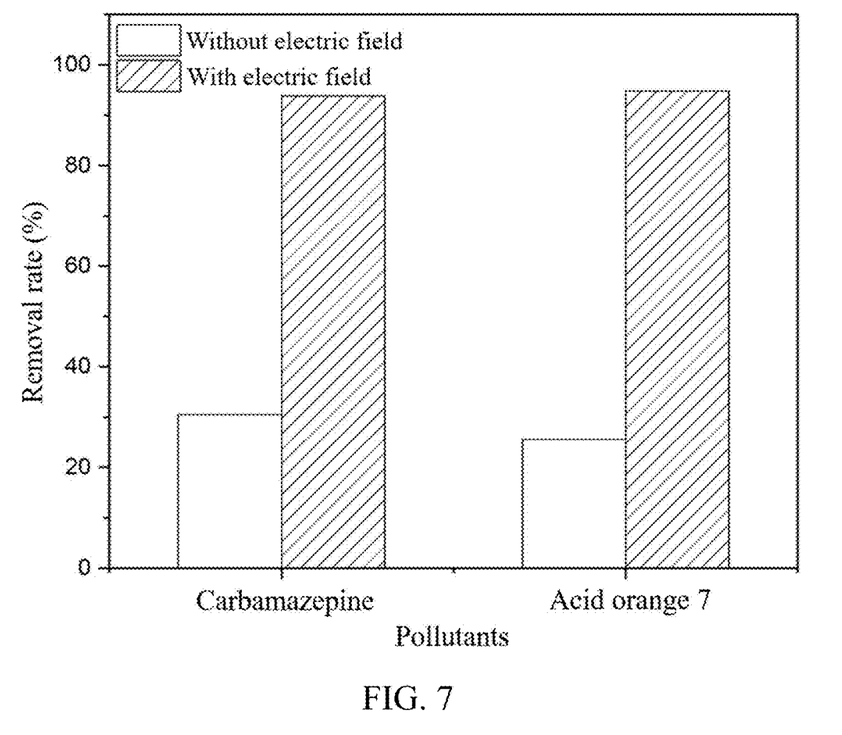
FIG. 7 is a diagram showing the removal effect of the water treatment material for electrically enhanced adsorptive filtration of Example 1 on organic pollutants.

The reaction system as shown in FIG. 1 was used to assist the test. Carbamazepine and acid orange 7 were used as representative cation and anion organic pollutants. 3 pieces of the water treatment material for electrically enhanced adsorptive filtration prepared in Example 1 were placed at the anode and the cathode respectively. The initial concentrations of the carbamazepine and the acid orange 7 were each 50 mg/L. As shown in FIG. 7, it could be found that under the action of the electric field, the removal rates of both the carbamazepine and the acid orange 7 were significantly improved.

5. Adsorptive Removal of SS and TOC in Water without Electric Field Enhancement

Figure 8:
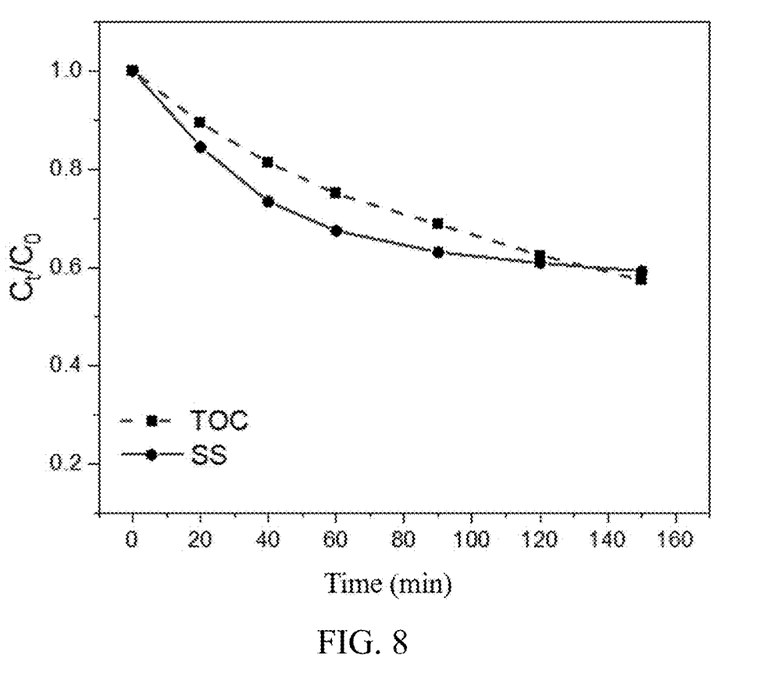
FIG. 8 is a diagram showing the removal effect of the ultralight and flexible carbon sponge of Comparative Example 1 on Total Organic Carbon (TOC) and Suspended Solids (SS)

The reaction system as shown in FIG. 1 was used to assist the test, and no voltage was applied. Domestic sewage was taken as a water sample to be purified, and 3 pieces of the amino-modified sponge prepared in Comparative Example 2 were placed at the anode and the cathode respectively. As shown in FIG. 8, after filtration for 150 min, 43% of TOC and 40% of SS could be removed.

Figure 9:
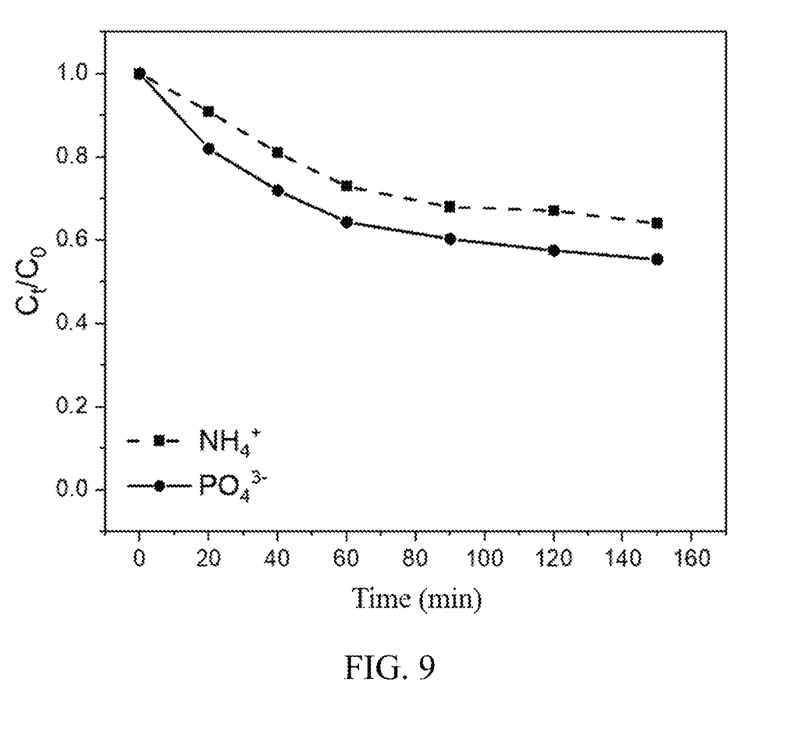
FIG. 9 is a diagram showing the removal effect of the ultralight and flexible carbon sponge of Comparative Example 1 on ammonia nitrogen and phosphates.

6. Adsorptive Removal of Nitrogen and Phosphorus in Water Under Electric Field Enhancement The reaction system as shown in FIG. 1 was used to assist the test. Simulated wastewater was formulated with ammonium chloride and sodium dihydrogen phosphate for the experiment, with an ammonia nitrogen concentration of 20 mg/L and a phosphate concentration of 2 mg/L. 3 pieces of the ultralight and flexible carbon sponge prepared in Comparative Example 1 were placed at the anode and the cathode, respectively. As shown in FIG. 9, 36% of the ammonia nitrogen and 45% of the phosphate could be removed under an electric field of 2 V within a treatment time of 150 min.

The preferred embodiments of the present disclosure are described in detail as above. It should be understood that many modifications and changes can be made by those ordinary skilled in the art based on the concept of the present disclosure without creative effort. Therefore, any technical scheme obtained through any modification, equivalent substitution, improvement, etc., made by those ordinary skilled in the art based on the concept of the present disclosure through logical analysis, reasoning or limited experiments on the basis of the prior art should fall within the claimed scope defined by the claims.

What is claimed is:

1. A preparation method for a water treatment material for electrically enhanced adsorptive filtration, comprising the following steps:
(1) ultrasonically cleaning a melamine sponge, oven-drying the cleaned sponge, placing the oven-dried sponge in a tubular furnace, introducing a protective gas to the tubular furnace, preheating the tubular furnace at a rate of 4-6° C.·min$^{-1}$ for 20-40 min to a temperature of 200-300° C., then heating the tubular furnace to a temperature of 900-1,100° C., maintaining the temperature of the tubular furnace at 900-1,100° C., and then cooling to room temperature to obtain a compressible carbon sponge; and
(2) dissolving tris(hydroxymethyl)aminomethane in a solvent to obtain a tris(hydroxymethyl)aminomethane solution, adjusting a pH to 8.4-8.6, then adding dopamine and polyethyleneimine to the solution, mixing to obtain a mixture, adding the compressible carbon sponge to the mixture, and reacting under stirring for 10-14 h to prepare the water treatment material for electrically enhanced adsorptive filtration.

2. The preparation method of claim 1, wherein in the step (1), the placing in the tubular furnace further comprises placing the oven-dried sponge in a corundum burning boat, and then placing the corundum burning boat in the tubular furnace.

3. The preparation method of claim 1, wherein in the step (1), the introducing the protective gas is conducted at a rate of 80-120 mL/min.

4. The preparation method of claim 1, wherein in the step (1), the protective gas comprises at least one of Ar, $N_2$, and $H_2$.

5. The preparation method of claim 1, wherein in the step (2), a mass concentration of the tris(hydroxymethyl)aminomethane solution is 0.1%-1%.

6. The preparation method of claim 1, wherein in the step (2), a mass ratio of the dopamine to the polyethyleneimine is 1:1 to 1:4.

7. The water treatment material for electrically enhanced adsorptive filtration, wherein the water treatment material for electrically enhanced adsorptive filtration is prepared by the preparation method of claim 1.

8. A method for adsorptive removal of a pollutant in a water body comprising:
using the water treatment material for electrically enhanced adsorptive filtration of claim 7 as an anode and a cathode;
providing an electric field; and
adsorptively removing the pollutant from the water body.

9. The method of claim 8, wherein the pollutant in the water body is selected from the group consisting of total suspended solids, total organic carbon, ammonia nitrogen, phosphates, organic matter, and a combination thereof.

10. The method of claim 9, wherein the organic matter is selected from the group consisting of carbamazepine, acid orange 7, and a combination thereof.

11. The water treatment material for electrically enhanced adsorptive filtration of claim 7, wherein an adsorption capacity of the water treatment material for adsorptive filtration is enhanced under an action of an electric field.

12. The water treatment material for electrically enhanced adsorptive filtration of claim 7, wherein the water treatment material is a) compressible, b) porous with pores that are adjustable in size, c) configured to adsorb a pollutant in a compressed state, and d) configured to desorb the adsorbed pollutant in a decompressed state by backwashing.

13. The water treatment material for electrically enhanced adsorptive filtration of claim 12, wherein the pollutant is selected from the group consisting of total suspended solids, total organic carbon, ammonia nitrogen, phosphates, organic matter, and a combination thereof.

14. The preparation method of claim 1, wherein in the step (1), the oven-drying is conducted at a temperature of 100-110° C. for a time of 8-16 h.

15. The preparation method of claim 1, wherein in the step (1), the keeping the temperature lasts for a time of 100-150 min.

16. The preparation method of claim 1, wherein in the step (2), the solvent is ultrapure water.

17. The preparation method of claim 1, wherein the tubular furnace is a quartz tubular furnace.

18. The preparation method of claim 1, wherein in the step (1), the ultrasonic cleaning is conducted for 8-12 min.

* * * * *